(12) United States Patent
Harold (10) Patent No.: US 9,088,704 B2
(45) Date of Patent: Jul. 21, 2015

(54) APPARATUS AND METHODS FOR DOCUMENT IMAGE CAPTURE

(71) Applicant: Patrick J. Harold, Madison, CT (US)

(72) Inventor: Patrick J. Harold, Madison, CT (US)

(*) Notice: Subject to any disclaimer, the term of this patent is extended or adjusted under 35 U.S.C. 154(b) by 3 days.

(21) Appl. No.: 13/905,075

(22) Filed: May 29, 2013

(65) Prior Publication Data

US 2013/0321698 A1     Dec. 5, 2013

Related U.S. Application Data

(60) Provisional application No. 61/654,800, filed on Jun. 1, 2012.

(51) Int. Cl.

| | |
|---|---|
| *A47B 41/04* | (2006.01) |
| *H04N 5/225* | (2006.01) |
| *F16M 11/04* | (2006.01) |
| *F16M 11/38* | (2006.01) |
| *F16M 13/00* | (2006.01) |
| *A47B 23/04* | (2006.01) |

(52) U.S. Cl.
CPC ............ *H04N 5/2252* (2013.01); *A47B 23/042* (2013.01); *F16M 11/046* (2013.01); *F16M 11/38* (2013.01); *F16M 13/00* (2013.01)

(58) Field of Classification Search
CPC ....................................................... A47B 41/02
USPC .......... 108/32, 59, 92, 93, 96, 101; 211/41.5, 211/41.6; 312/183
See application file for complete search history.

(56) References Cited

U.S. PATENT DOCUMENTS

| | | | | | |
|---|---|---|---|---|---|
| 1,106,265 | A | * | 8/1914 | Whittle ............................ | 40/383 |
| 4,121,377 | A | * | 10/1978 | Allen et al. ........................ | 47/18 |
| 4,640,199 | A | * | 2/1987 | Zigman .............................. | 108/6 |
| 4,646,655 | A | * | 3/1987 | Robolin ........................... | 108/92 |
| 4,884,773 | A | * | 12/1989 | Becker ........................... | 248/639 |
| D319,909 | S | * | 9/1991 | Snediker et al. ................ | D6/511 |
| 5,184,737 | A | * | 2/1993 | Hardy ............................. | 211/55 |
| 6,398,326 | B1 | * | 6/2002 | Wang .......................... | 312/223.3 |
| 6,708,941 | B1 | * | 3/2004 | Bowen et al. .............. | 248/345.1 |

* cited by examiner

*Primary Examiner* — Matthew Ing
(74) *Attorney, Agent, or Firm* — Lyman H. Smith (57) ABSTRACT

A portable, user assembled apparatus has interlocking parts and no fasteners, or the apparatus is preassembled such that, once assembled, the apparatus holds both a document at a fixed angle and a portable camera-equipped electronic device, at the same and parallel angle, a fixed distance from the document. The apparatus sits on a table or desktop and allows the user to work in the sitting position. The user can make initial adjustments to set the mobile device in a fixed position such that the entire document image is in the viewfinder and in focus. These one-time position settings can be preserved. When the camera shutter is executed, both the document and device do not move. The device provides a novel way for mobile device users to quickly and easily capture many document images with optimum image quality and uniform image size.

8 Claims, 9 Drawing Sheets

APPARATUS AND METHODS FOR DOCUMENT IMAGE CAPTURE

CROSS-REFERENCE TO RELATED APPLICATION

This application claims the benefit of priority of U.S. provisional application No. 61/654,800, filed Jun. 1, 2012, the contents of which are herein incorporated by reference.

BACKGROUND OF THE INVENTION

The present invention relates to document image capture apparatus and methods and more particularly, to an apparatus and method for more efficient document image capture using mobile smart phones and tablets.

Most smart phones, such as the Apple iPhone, include a high resolution, full color camera as a standard feature. In addition to the built-in camera application (app), many third party camera apps can be loaded on smart phones to provide additional document image processing capabilities.

These apps promote the concept of using the smart phone's camera to capture traditional documents, mimic a document scanner, and then transfer the document or store the document. The apps add functions that are needed to capture document images, such as convert an image to black and white, adjust resolution and contrast, set or crop image size, optimize/reduce file size, format file to PDF, transmit file, and the like.

Typically, these apps require the user to place a document on a flat surface, such as a table, and use the camera's view finder to move the device to a location that allows approximately a full view of the entire document page with as little skew as possible. Once the device is positioned to focus the image in full view, and image skew has been minimized, the user enables the camera shutter and captures the image.

After the image is captured, app tools can be used to further reduce image skew and better define the borders of the document image. Then, the image is converted to PDF or JPEG. The resulting file is then typically transferred via email or uploaded to a server.

The user takes significant time to stand above the document and manually move the smart phone or tablet in three dimensions to determine focus and approximate a full view of the entire document. Moreover, when the user activates the shutter button to capture the image, this can cause the device to move and render the image unusable and require the process to be repeated. Often, the image that is captured needs to be further enhanced using software tools, such as crop, deskew, and the like, provided in the app. This ends up being a tedious and time consuming task for each image.

As can be seen, there is a need for an improved apparatus and device for capturing document images using tablets, smart phones, or similar portable electronic devices.

SUMMARY OF THE INVENTION

In one aspect of the present invention, an image capture device comprises first and second side members; a document bed supported by the first and second side members at a first side of the first and second side members; a plurality of slots formed in a second, opposite side of the first and second side members; a shelf fitting a selected one of the plurality of slots formed in the first and second side members, the selected one of the plurality of slots selected such that an electronic device resting on the shelf can photograph a document resting against the document bed; and a device fence resting on the shelf, the device fence supporting the electronic device resting on the shelf.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable, user assembled apparatus with interlocking parts and no fasteners. Once assembled, the apparatus holds both a document at a fixed angle and a camera-equipped smart phone, a camera-equipped tablet device, or some similar portable camera-equipped electronic device, at the same and parallel angle, a fixed distance from the document. The apparatus sits on a table or desktop and allows the user to work in the sitting position. The user can make initial adjustments to set the mobile device in a fixed position such that the entire document image is in the viewfinder and in focus. These one-time position settings can be preserved. When the camera shutter is executed, both the document and device do not move. The device of the present invention provides a novel way for mobile device users to quickly and easily capture many document images with optimum image quality and uniform image size.

Referring now to FIGS. 1 through 5, two parallel and identical stands 10 can hold a document bed 12 for supporting a document 14. The document bed 12 can include two cut outs 16 that interlock with the stands 10 at a 90 degree angle. Optional document beds can be offered to optimize the assembly for various page sizes, such as 8.5×11, A4, legal, and the like. The document bed 16 rests on the stands 10 and is held at a fixed vertical angle. A document 14 placed on the bed 12 will rest in the same vertical angle. The document bed 12 can be colored white, for example, to optimize contrast when imaging white documents.

Figure 2:
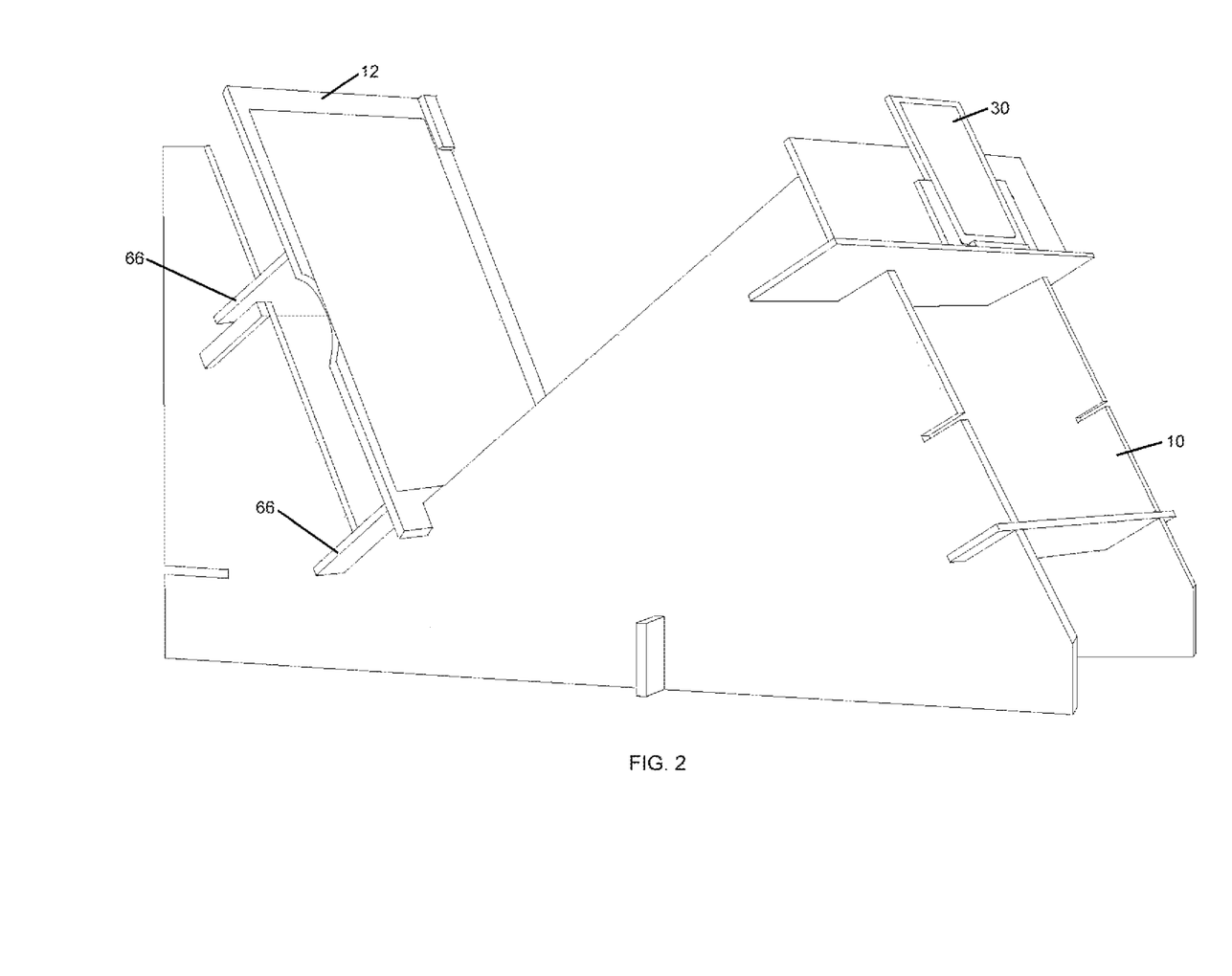
FIG. 2 is a perspective view of the document image capture apparatus of FIG. 1, including optional horizontal supports to adjust the position of the document bed.
Figure 3:
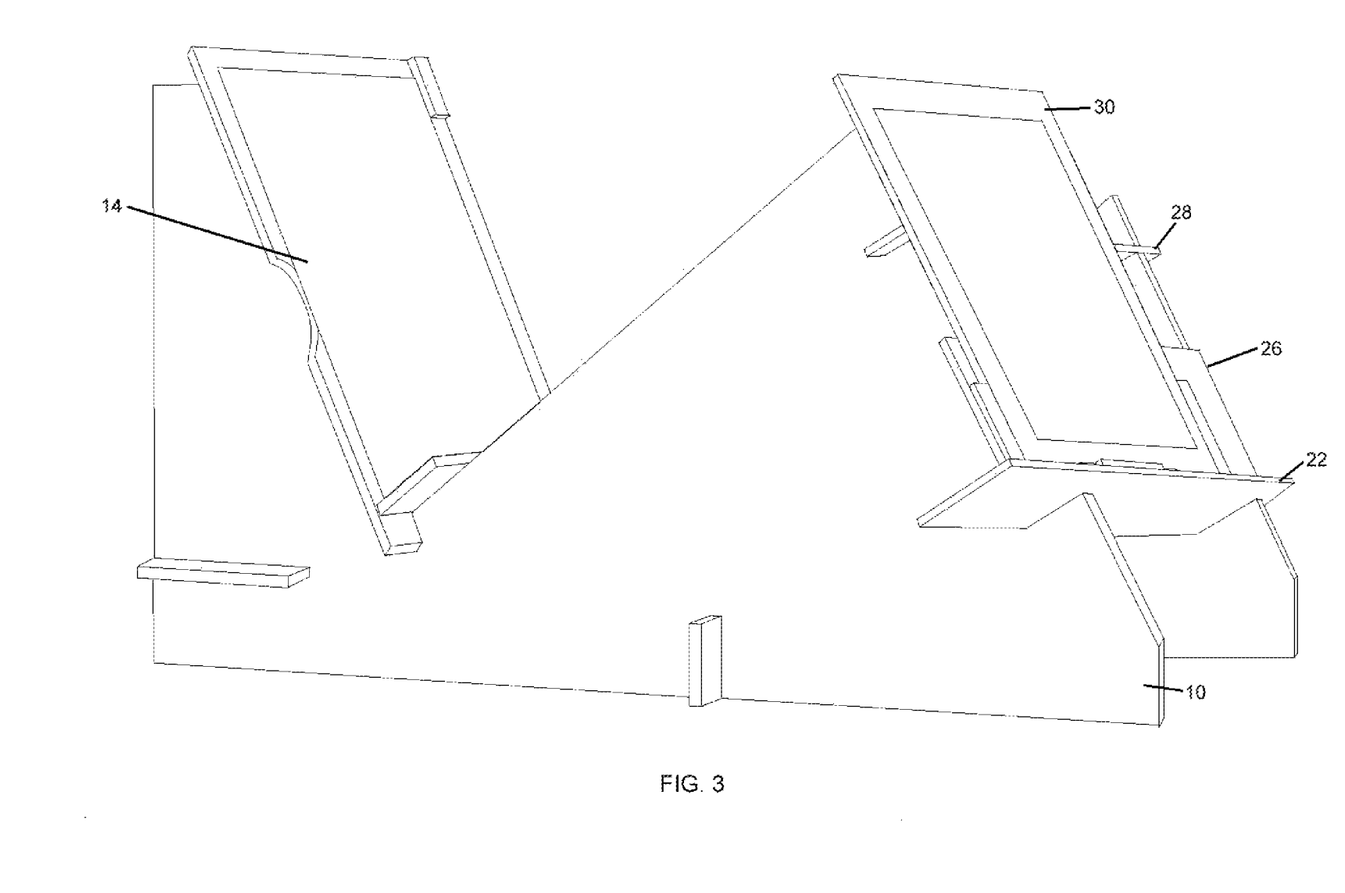
FIG. 3 is a perspective view of the document image capture apparatus of FIG. 1, used with a tablet computer.
Figure 4:
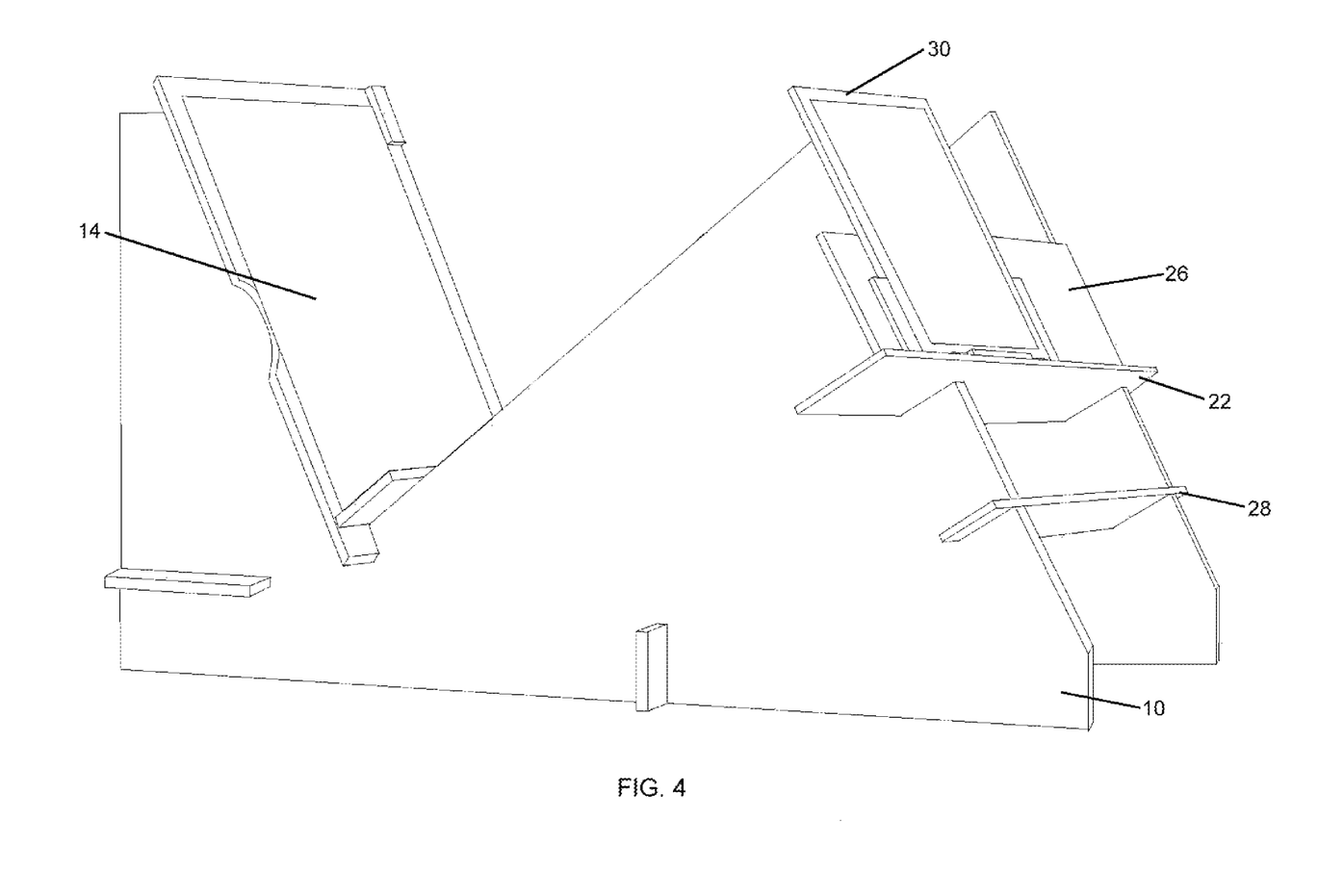
FIG. 4 is a perspective view of the document image capture apparatus of FIG. 1, used with a mini-tablet computer.

The document bed 12 can be moved forward (closer to an electronic device 30) by using two or more document bed spacers 66. This adjustment may be useful for use of various electronic devices.

Figure 1:
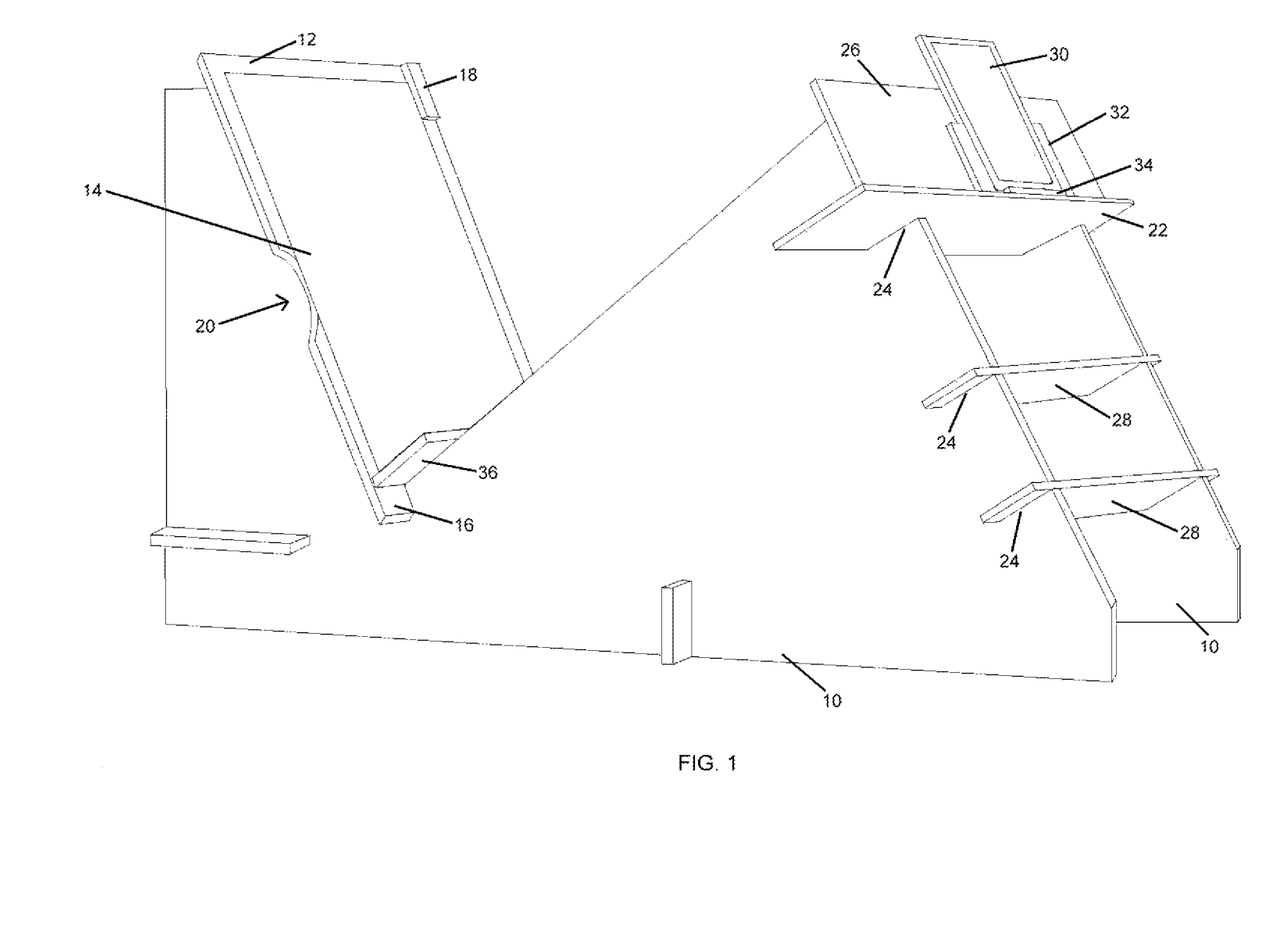
FIG. 1 is a perspective view of a document image capture apparatus, used with a smartphone, according to an exemplary embodiment of the present invention.

The document bed 12 includes prefixed stops 18 (white) that insure that that the document 14 is always placed in the same fixed position. The standard stops accommodate 8.5×11 or A4 paper sizes, for example. The document bed 12 can include a semi-circular cut out 20 to allow the user to easily grasp and insert or remove the document 14. To accommodate other sheet sizes the document bed 12 can be turned over The back side is not configured with any installed stops but extra stops (peal and stick) can be provided and could be added by the user to configure the apparatus to accommodate custom sheet sizes (e.g., business cards or receipts).

The stands 10 also allow a device shelf 22 to be interlocked with the stands 10. This positions the shelf 22 perpendicular to the document bed 12. The user can choose to place the shelf 22 in a number of interlocking cut outs 24 in the stands 10 depending on the mobile device in use. The ability to move the device shelf 22 to a different vertical position accommodates the height of different, camera equipped, mobile smart phones, tablets, or other devices (e.g., iPhone or iPad).

A device fence 26 is then interlocked with the shelf 22 and rests against the stands 10. This positions the fence 26 at a fixed distance and at the same angle and parallel plane as the document bed 12. Together, the shelf 22 and fence 26 can hold one of a variety of camera equipped smart phones or tablets available for purchase from different manufacturers. Also, the shelf 22 and fence 26 can be turned over, and using the above process, be set up to accommodate a second device.

After the shelf 22 has been moved to the appropriate slots for operation, horizontal supports 28 can be placed in the slots 24 that are not being used by the shelf 22.

To set the horizontal and vertical position of the device for operation, the document 14 is placed on the document bed 12. The user can place the device 30 on the device shelf 22 and against the device fence 26 with the camera lens facing the document bed 12. The device user interface faces the user. The user can move the device 30 horizontally on the shelf to center the vertical target line in the center of the view finder. Some devices also include a camera grid option that can be turned on to aid the positioning of the device 30. Device peal and stick position stops 32 can then be placed on both sides of the device 30.

If needed, the device 30 can be raised vertically by placing a peal and stick spacer under the device until the horizontal target line is centered. A peal and stick position stop 34 can also be placed on the device shelf 22 and in front of the device 30. This prevents the bottom of the device 30 from moving as the top of the device's touch screen user interface is pressed for operation. Once the initial setup is completed, the device 30 can be repeatedly positioned between the stops for each use.

In addition there is an option to insert and interlock one or two fences 36 with the document bed 12 to provide an added ability install a variety of documents smaller than the standard 8.5×11 or A4 sizes using the bed 12 in the standard position. Adding this option will also allow multiple pages to be supported at one time. This option also provides an additional method for adjusting the vertical position of the document.

Figure 5:
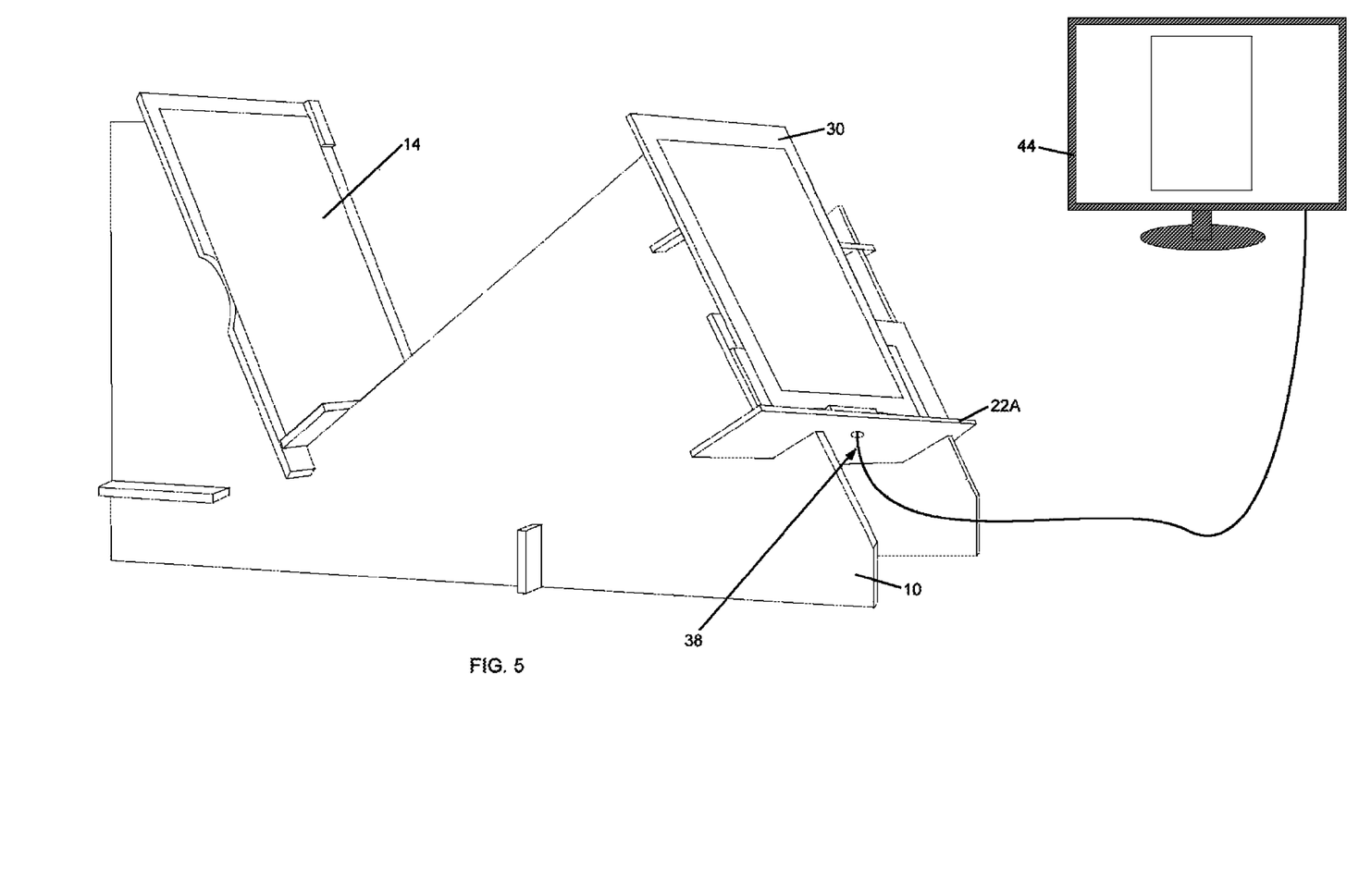
FIG. 5 is a perspective view of the document image capture apparatus of FIG. 3, showing a video display adapter attached to the tablet computer to permit display on an external monitor.

Referring to FIG. 5, the shelf 22 can be modified with a display video adapter cable hole 38 to allow a video display 44, such as a monitor, to mimic the display of the device 30.

Figure 6:
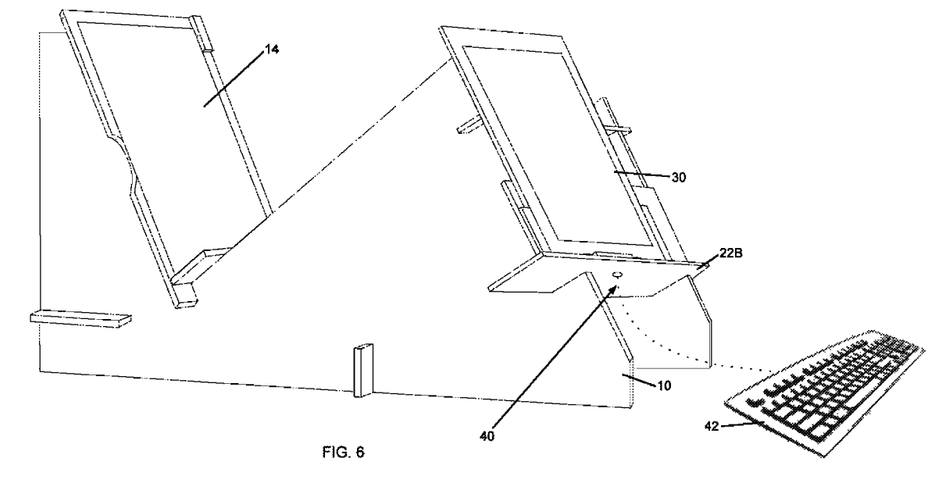
FIG. 6 is a perspective view of the document image capture apparatus of FIG. 3 with a keyboard adapter for use of a wired keyboard, alternately the device may support a wireless keyboard.

Referring now to FIG. 6, the shelf 22 can be modified into a keyboard adapter shelf 22B, where a hole 40 in the shelf can allow a wired keyboard 42, or a wireless keyboard, to input data into the device 30.

Figure 7:
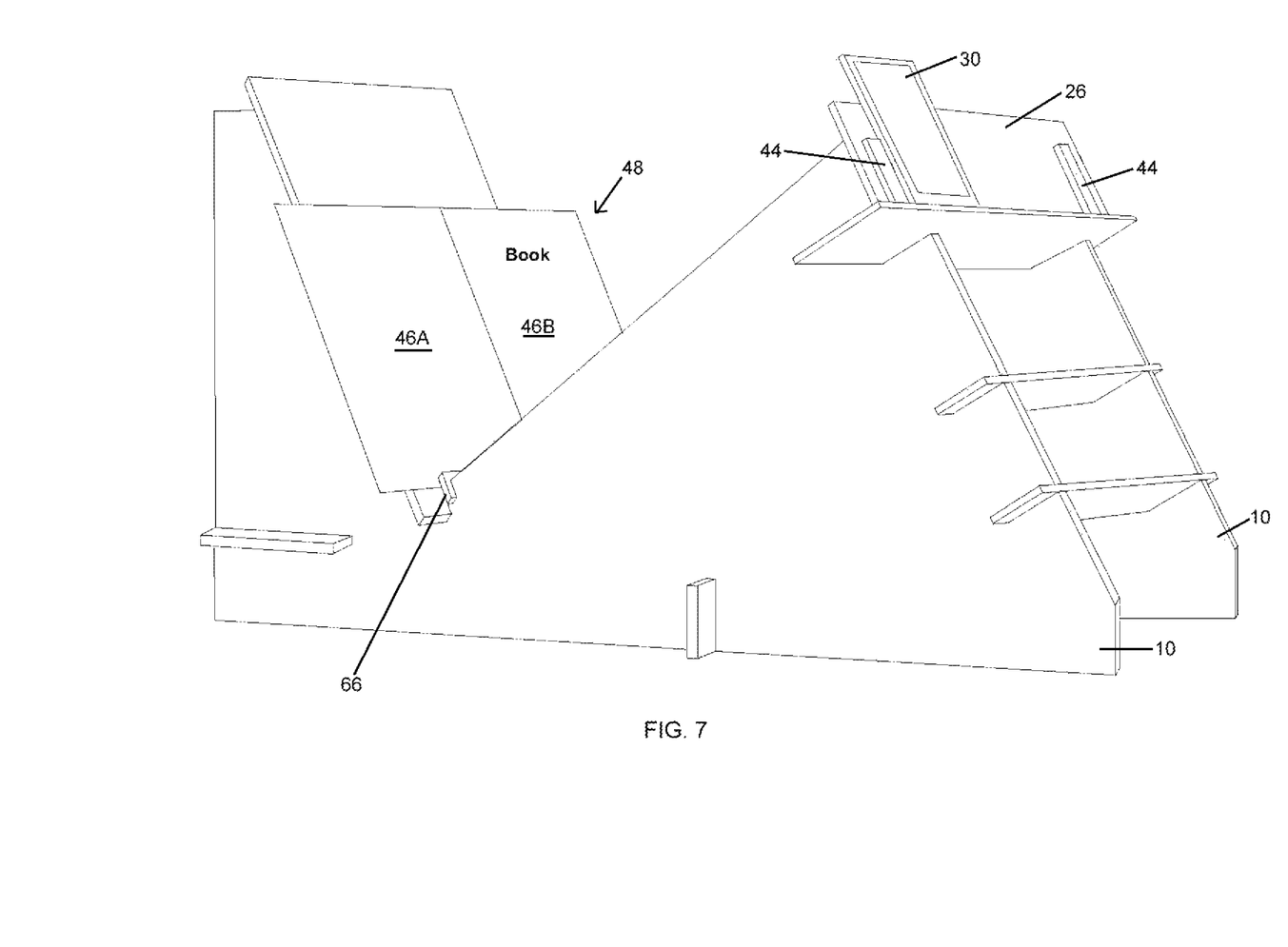
FIG. 7 is a perspective view of the document image capture apparatus of FIG. 1 with book capture capabilities.

Referring to FIG. 7, the device fence 26 can include stops 44 on opposite sides thereof, positioned so that when the device 30 is placed against one stop, the device 30 can photograph one page 46A of a book 48, and when the device 30 is placed against the other stop, the device 30 can photograph another page 46B of the book 48. In some embodiments, the device fence can be made with variable thicknesses to accurately point a camera in the device 30 toward each opposite page of the book 48 as the device 30 is moved along the shelf. A page holder 66 can be provided to hold the book 48 open.

Figure 8:
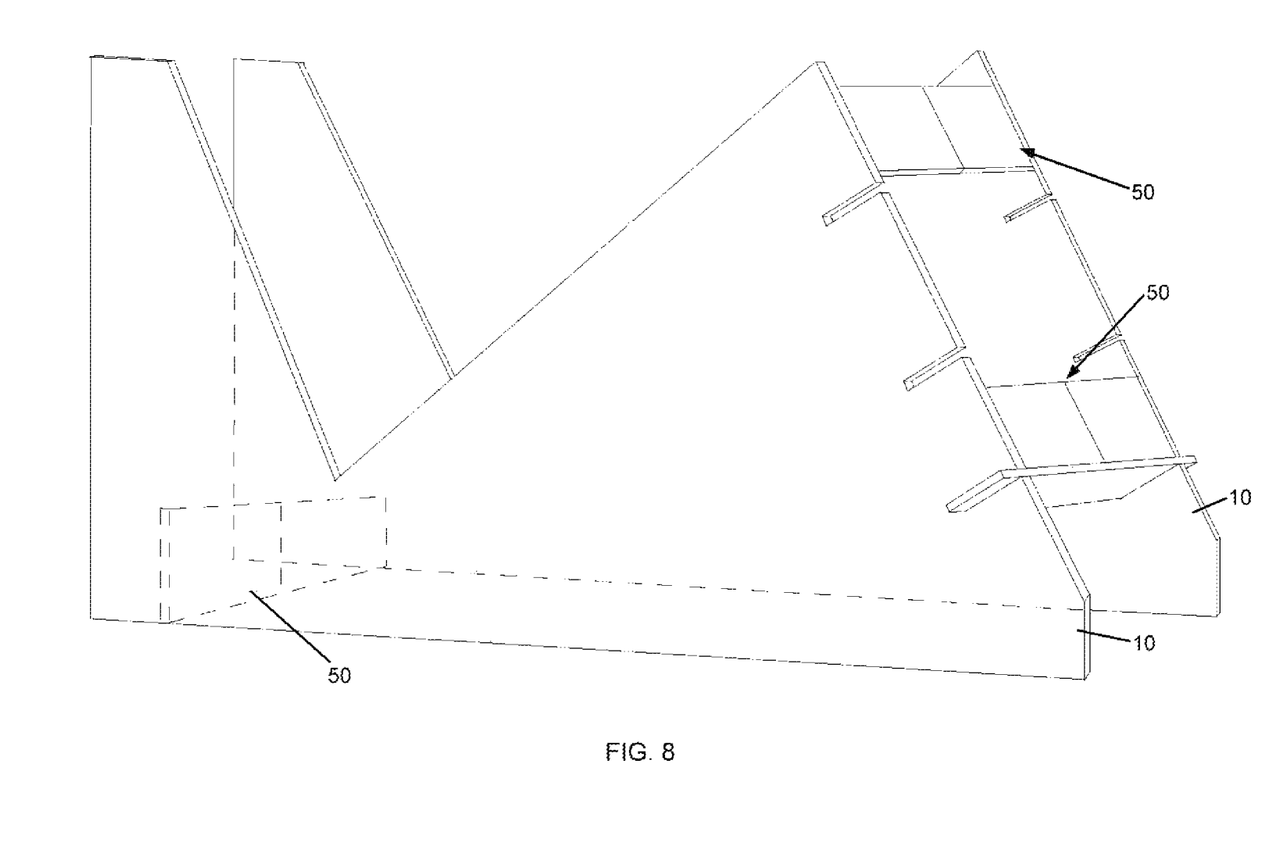
FIG. 8 is a perspective view of a pop-up configuration of the document image capture apparatus of FIG. 1.

Referring to FIG. 8, the image capture device can collapse and fold together. For example, sides 10 of the image capture device can collapse together, held together with one or more hinged horizontal supports 50.

Figure 9:
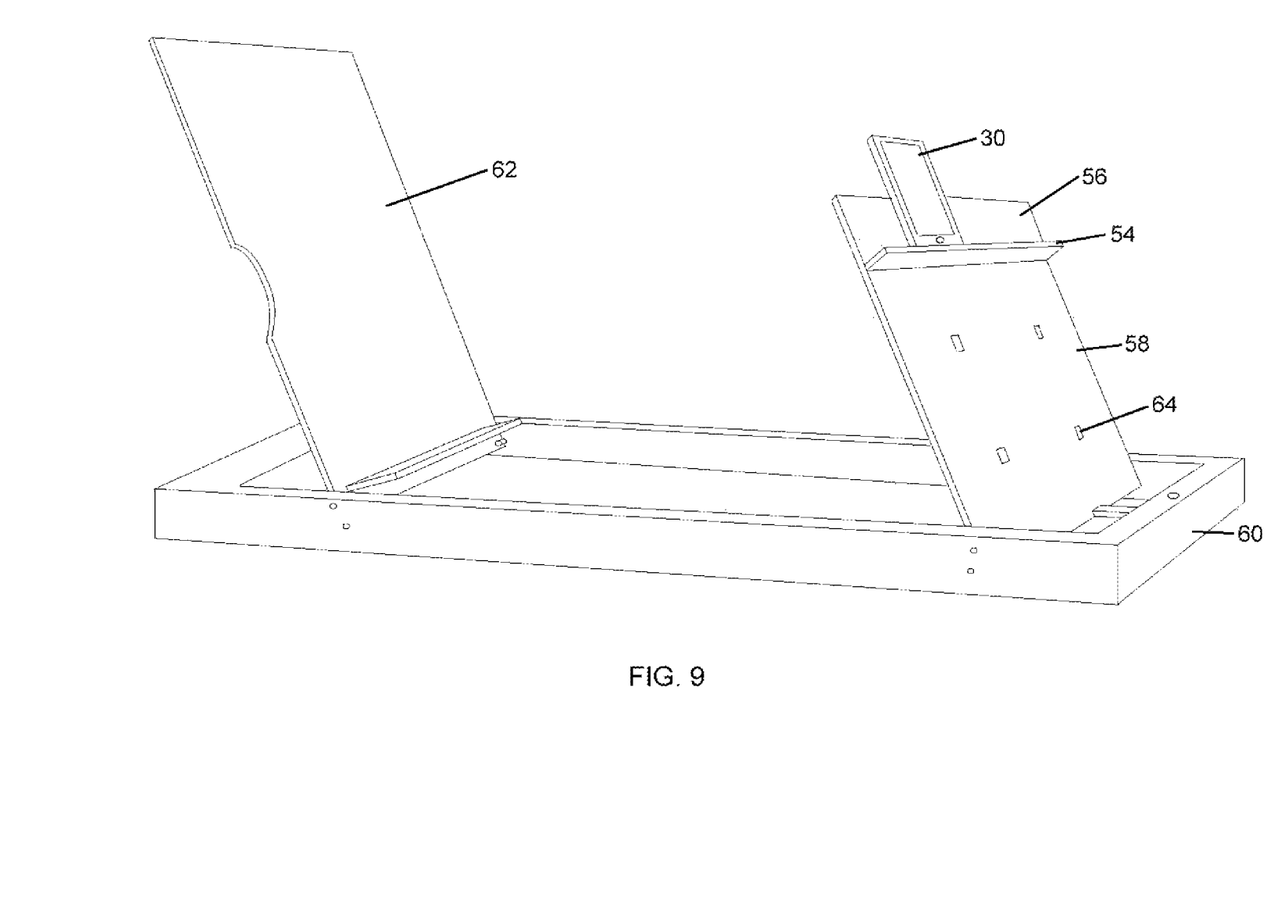
FIG. 9 is another view of a pop-up configuration of a document image capture apparatus according to an exemplary embodiment of the present invention.

In an alternative embodiment, as shown in FIG. 9, a pop-up image capture device 52 can include a shelf 54 and fence 56 that is attached to a hinged support 58 that is hingedly attached to a base member 60. A document support 62 can also be hingedly attached to the base member 60. The document support 62 and the hinged support 58 can be opened to provide the image capture device 52 that can photograph an page disposed on the document support 62. The hinged support 58 can include a means to position the shelf 54 at various heights. This means can be, for example, holes 64 in the hinged support 58.

The entire apparatus can be made from various materials, such as foam board (3/16 inch, clay coated, white polystyrene). The same material is available with or without peal and stick adhesive backing. One could cut the material using a razor knife to create each part of the assembly or the manufacture of the parts could be outsourced to a commercial or specialized enterprise to be die cut by machine. The parts are designed to be fitted together without the use of fasteners for easy assembly and disassembly.

The apparatus and method of the present invention provides several features. Some of these features include the following:

1) The invention fixes the position of both document and mobile device camera on parallel plains at a fixed distance to provide uniform image quality;
2) The invention allows mobile devices to capture a higher volume of document images in less time;
3) The invention is portable—parts can be assembled and disassembled, are light weight and can be laid flat and carried or shipped at low cost;
4) The invention can be used with various mobile device models;
5) The invention can be used with various document imaging apps;
6) The invention improves document imaging productivity—user can sit at a desk or table and work in a sitting position and provides easy access to the devices touch screen user interfaces; and
7) the invention increases the number of document imaging applications that can be performed with a mobile device. By efficiently capturing higher page volume and providing uniform image quality, other post processing applications (e.g., Optical Character Recognition OCR, Optical Mark Recognition OMR, Intelligent Character Recognition ICR, and barcodes) and document archiving applications can be more accurate and more efficient.

It should be understood, of course, that the foregoing relates to exemplary embodiments of the invention and that modifications may be made without departing from the spirit and scope of the invention as set forth in the following claims.

What is claimed is:

1. An image capture device comprising:
    a base member;
    a document bed supported by the base member, the document bed positionable in a first document bed position, where the document bed extends from the base member at an angle, and a document bed storage position, where the document bed is positioned adjacent the base member;
    a support supported by the base member, the support positionable in a first support position, where the support extends from the base member at an angle, and a support storage position, where the support is positioned adjacent the base member;
    a plurality of holes formed in the support;
    a shelf fitting a selected one of the plurality of holes formed in the support, the selected one of the plurality of slots selected such that an electronic device resting on the shelf can photograph a document resting against the document bed; and
    a device fence extending from the shelf, the device fence supporting an electronic device resting on the shelf.

2. The image capture device of claim 1, further comprising a document bed height adjustment device disposed under the document bed to raise the document to a desired height.

3. The image capture device of claim 1, wherein the device fence is formed from a portion of the support extending beyond the shelf.

4. The image capture device of claim 1, further comprising a page holder configured to keep a book open when positioned on the document bed.

5. The image capture device of claim 1, further comprising stops disposed on the device fence to position the device therebetween.

6. The image capture device of claim 5, wherein the stops are positioned so that the electronic device can photograph opposite pages of a book disposed on the document bed.

7. The image capture device of claim 1, further comprising a display video adapter hole formed in the shelf to permit a cable to extend from the electronic device to an external monitor.

8. The image capture device of claim 1, further comprising a keyboard access hole formed in the shelf to permit a wired keyboard to be used with the electronic device.

* * * * *